Sheet 1.
3 Sheets.
E. Beard.
Impd Moth-Proof Bee-Hive Portal.
N° 75349  Patented Mar. 10, 1868.
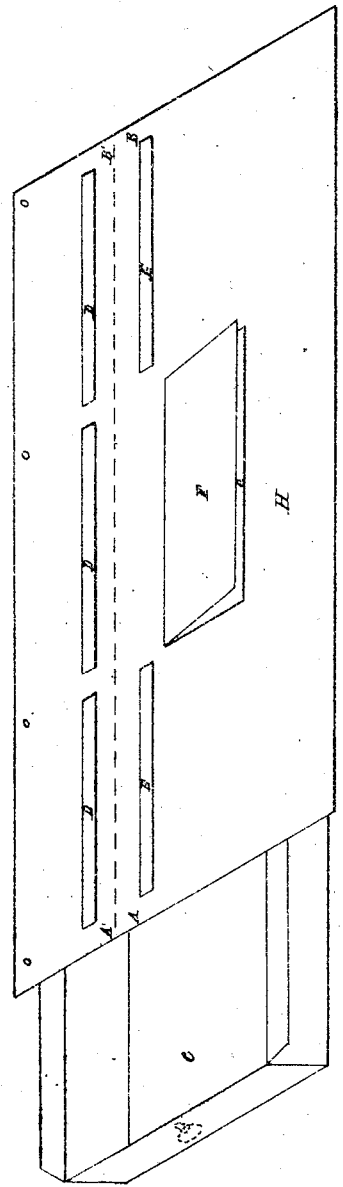
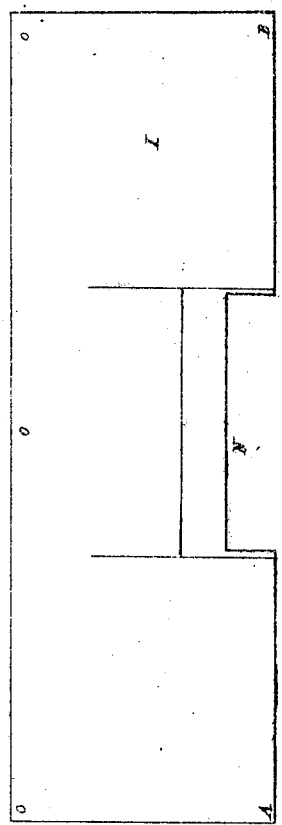
Witnesses.
Inventor.
Enoch Beard Sheet 2.
3 Sheets.

E. Beard.
Moth-Proof Bee-Hive Portal.

Nº 75349    Patented Mar. 10, 1868.

Witnesses.
N. Hildreth
Wᵐ Olthost

Inventor.
Enoch Beard

E. Beard.
Moth-Proof Bee-Hive Portal.
N° 75349. Patented Mar. 10, 1868.
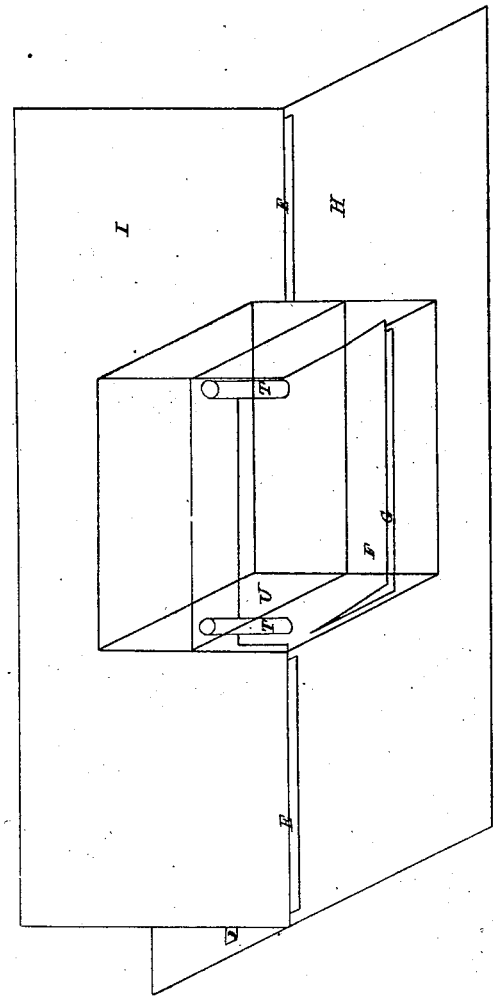
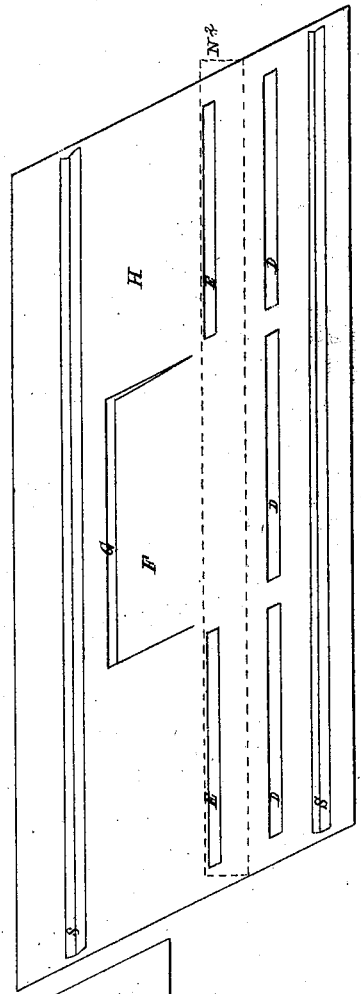
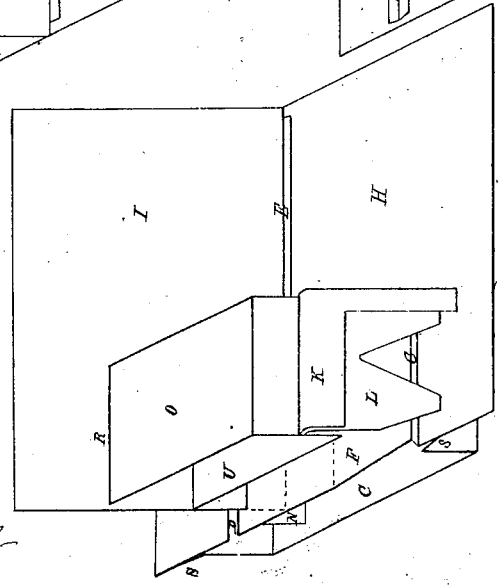
Witnesses.
Inventor:
Enoch Beard

United States Patent Office.

ENOCH BEARD, OF SALEM, IOWA.

Letters Patent No. 75,349, dated March 10, 1868.

---

IMPROVEMENT IN MOTH-PROOF BEE-HIVE PORTAL.

---

*The Schedule referred to in these Letters Patent and making part of the same.*

---

TO ALL WHOM IT MAY CONCERN:

Be it known that I, ENOCH BEARD, of Salem, in the county of Henry, and State of Iowa, have invented a new and useful "Moth-Proof Bee-Hive Portal," for affording to the bees a sufficient means of ingress and egress to the hive, capable of being modified, so as to admit few or many at a time, or in cold weather, and, on occasion of the hive's being moved, of being closed altogether, so as to preclude exit from the hive, ventilation meanwhile supplied by means of holes at the sides. It also acts as a proof against the entrance into the hive of moths, and as a device for killing them when seeking to escape from hives in which they have gained a residence before this was attached. And I do hereby declare that the following is a full, clear, and exact description of the construction and operation of the same, reference being had to the accompanying drawings, making a part of this specification, in which—

Figure 1 is a perspective view of the platform or table, with drawer underneath.

Figure 2, a plain view of the back or upright plate by which the instrument is attached to the hive.

Figure 6 is a perspective, showing cross-section of the portal about the middle, including back platform and drawer.

Figure 7 is a perspective view, exhibiting the tubes through transparent sides of the portal.

Figure 8 is the platform inverted.

Figure 3:
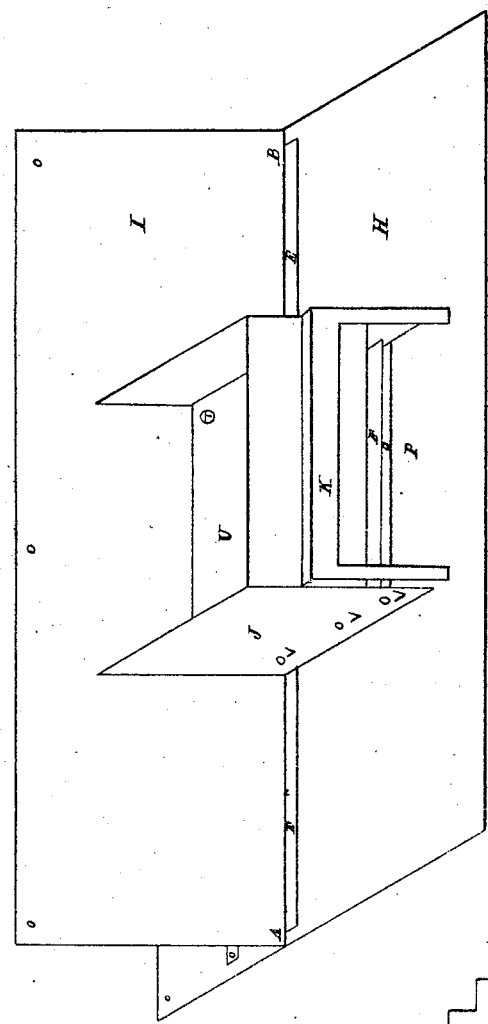
Figure 3 is a perspective view of the platform, with back attached and entrance-way.
Figure 4:
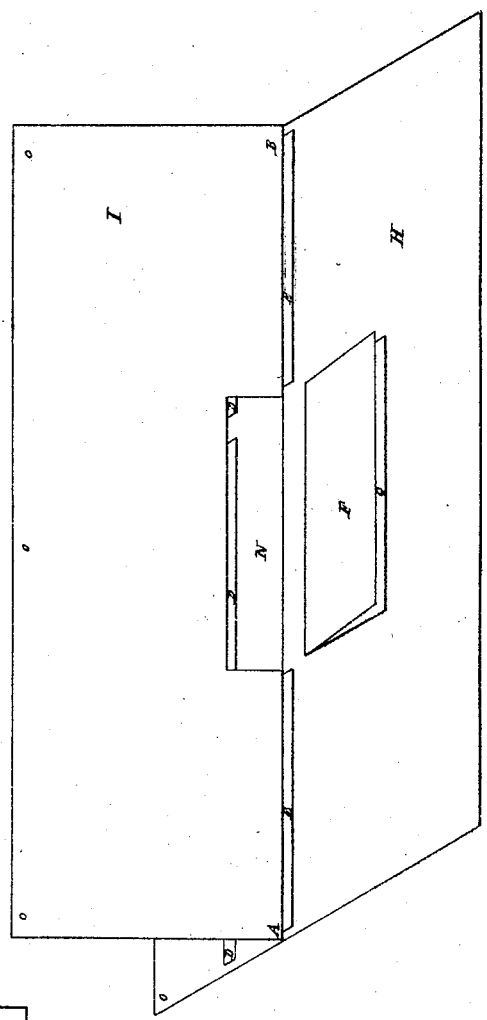
Figure 4 is the same without the entrance-way.
Figure 5:
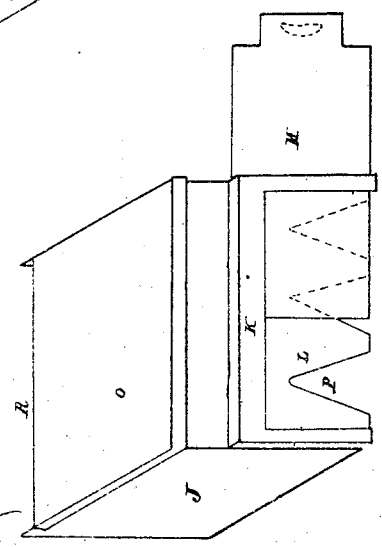
Figure 5 is a perspective view of the entrance-way, portal, or gate proper, with movable gauge and slide.

The "moth-proof bee-hive portal" may be made of any size convenient, and adapted to any hive. It may be made of tin, of cast or sheet iron, or of wood, but most readily and conveniently of tin. It is attached to the hive by means of nails or screws through the back or upright plate, (fig. 2,) against the face or entrance side of the hive. There may, however, if it is desired, be more than one entrance, and if so, more than one of these "portals" used. The platform H, (as seen in fig. 1,) will, when the portal is attached, extend under the edge of the hive, to the limit of the dotted line, or the location of the upright plate, and the bottom board being attached against it, and the screws or nails driven, the contrivance will be securely fastened to the hive. The drawer C will be filled with water, oil, molasses, spirits, or any other liquid. The only place of entrance for the bees will be through the passage P, which may be left entirely open, or fitted with the toothed gauge L, which is free to pass through the grooves K, and be located as desired, or entirely closed by means of the plain slide M. By means of the gauge L and the slide M, the size of the entrance-way can be regulated at will. Should the way be closed in swarming season, or cold weather, or on moving the hive, the air can reach the bees through small holes V V V, punched in the sides, which can be amply large for all purposes of ventilation, yet too small to allow the exit of bees or entrance of moths. The slide M being drawn back, and the gauge L being omitted or introduced, as may be desired, the bees will pass through the "portal," as seen in fig. 5, passing over the flap F, and entering the hive itself at N. This flap F is merely a piece of the table or platform H, cut and loosened on three sides, so that it may present, when lifted, the crevice G. Its distance from the entrance P is not material, though it may as well be close. Its breadth must exactly correspond with the inside breadth of the portal, that no chance may be afforded at the side for the passage of moths. The degree of elevation of the edge of this flap must be such that the crevice G, while readily admitting moths, shall not be large enough to allow the passage of bees. In this way, when the portal is open, the bees may pass in and out at all times. To make the entrance proof against moths, it is provided with the small crevices D D D, E E, the flap F disclosing the crevice G, and a small crevice, R, between the remote edge of the lid O and the back I, which opens into a box, connecting, by means of tubes or pipes T T, with the drawer C underneath. These crevices named, all open into the drawer C. The box J constituting the portal is divided into two stories, an upper and a lower story, about equal in size, separated by the partition or floor U. The upper story may be constituted a separate apartment, entirely open to the moths only, by means of the crevice R, above spoken of in the rear of the lid O. When this is done, this upper story must, like the trough, be filled with liquid. But it may also, as before stated, be connected with the trough C by means of the tubes T T. Of these, two or three will be sufficient, opening on the remote side of the upper story, as stated, close to the back I, extending thence down, standing as pillars before the entrance-way N, and connecting with the platform H, in the region of the dotted line. The tubes thus connecting, will open a clear way from the crevice R above to the drawer underneath. Of course if the moth chooses not to try this passage in seeking an entrance to the hive, it is at liberty to retire and attempt some one of the others described. These crevices now severally described, are all too small to admit the bees, but large enough readily to admit the moth and other small insects. The moth hovering from above, and alighting say against the back I, will pass down at the crevice R, back of the lid O, thence returning after ineffectual search, or extending its search by way of the tubes only to reach the liquid and be drowned; or, say, alighting on the platform H, it seeks to gain an entrance by the crevices E E, it will only meet the same fate, as these crevices open immediately into the drawer of liquid. The same may be said of the crevice G under the edge of the flap F. Lest it should be possible for the moth to pass on the under surface of the platform, and reach the hive by the crevices D D D, there is attached to such under surface, a partition, $N^2$, opposite the locality of the dotted line A' A'. This partition divides the drawer into two chambers, and extends nearly to the bottom of the drawer. The drawer then is filled with liquid up nearly to the under surface of the platform H. The partition will effectually prevent the moths from passing on the under surface into the hive. Again, should this "portal" be attached to a hive in which there are moths already, it will serve as a means of killing them, for at any time on fleeing from attacks of the bees, or seeking exit from the hive, they will pass into the crevices D D D, inside the bevelled under edge of the hive-face, and thence into the drawer of liquid underneath to be drowned.

What I claim in this as my invention, and desire to secure by Letters Patent, is—

1. I claim the platform H, with its crevices D D D and E E, and flap F, and crevice G, when constructed and used as set forth.

2. I claim the back I, when combined with the box J, and constructed and used as shown.

3. I claim the box J, separated into stories by the floor U, when constructed and used as set forth.

4. I claim the tubes T T, when constructed and used as herein shown.

5. I claim the drawer C, when combined with the partition $N^2$, and constructed and used as shown.

6. I claim the slide M, in combination with the movable gauge L, when constructed and used as set forth.

7. I claim the partition $N^2$, attached to the under surface of the platform H, when constructed and used as set forth.

ENOCH BEARD.

Witnesses:
  WM. C. GHOST,
  E. A. VANCISE.